US012345967B2

(12) United States Patent
Scofield et al.

(10) Patent No.: US 12,345,967 B2
(45) Date of Patent: Jul. 1, 2025

(54) OPTICAL MODULATOR

(71) Applicants: ROCKLEY PHOTONICS LIMITED, Altrincham (GB); UNIVERSITY OF SOUTHAMPTON, Southampton (GB)

(72) Inventors: Adam Scofield, Los Angeles, CA (US); Aaron John Zilkie, Pasadena, CA (US); Guomin Yu, Glendora, CA (US); Thomas Pierre Schrans, Temple City, CA (US); David John Thomson, Eastleigh (GB); Weiwei Zhang, Southampton (GB)

(73) Assignees: Rockley Photonics Limited, Altrincham (GB); University of Southampton, Southampton (GB)

( * ) Notice: Subject to any disclaimer, the term of this patent is extended or adjusted under 35 U.S.C. 154(b) by 381 days.

(21) Appl. No.: 17/753,276

(22) PCT Filed: Aug. 25, 2020

(86) PCT No.: PCT/EP2020/073756
§ 371 (c)(1),
(2) Date: Feb. 25, 2022

(87) PCT Pub. No.: WO2021/037853
PCT Pub. Date: Mar. 4, 2021

(65) Prior Publication Data
US 2022/0404650 A1    Dec. 22, 2022

Related U.S. Application Data

(60) Provisional application No. 62/933,286, filed on Nov. 8, 2019, provisional application No. 62/891,878, filed on Aug. 26, 2019.

(51) Int. Cl.
*G02F 1/025* (2006.01)
*G02F 1/01* (2006.01)

(52) U.S. Cl.
CPC ............ *G02F 1/025* (2013.01); *G02F 1/0147* (2013.01); *G02F 2202/06* (2013.01); *G02F 2203/15* (2013.01)

(58) Field of Classification Search
CPC ...................................................... G02F 1/025
See application file for complete search history.

(56) References Cited

U.S. PATENT DOCUMENTS

2004/0208454 A1   10/2004 Montgomery et al.
2011/0097030 A1    4/2011 Urino
(Continued)

FOREIGN PATENT DOCUMENTS

| WO | 2016018285 A1 | 2/2016 |
| WO | 2019038600 A1 | 2/2019 |

OTHER PUBLICATIONS

Gottlob, H. D. B. et al., "Introduction of crystalline high-k gate dielectrics in a CMOS process", Journal of Non-Crystalline Solids, Jul. 15, 2005, pp. 1885-1889, vol. 351, No. 21-23, Elsevier B.V.
(Continued)

*Primary Examiner* — Michael Stahl
(74) *Attorney, Agent, or Firm* — Womble Bond Dickinson (US) LLP

(57) ABSTRACT

An optical modulator. The optical modulator comprising: a micro-ring resonator; and a bus waveguide, including an input waveguide region, an output waveguide region, and a coupling waveguide region optically coupled to the micro-ring resonator and located between the input waveguide region and the output waveguide region. The micro-ring resonator includes a modulation region, the modulation region being formed of a silicon portion and a III-V semiconductor portion separated by a crystalline rare earth oxide dielectric layer.

20 Claims, 10 Drawing Sheets

(56) References Cited

U.S. PATENT DOCUMENTS

| | | | |
|---|---|---|---|
| 2015/0055910 A1 | 2/2015 | Liang | |
| 2017/0102563 A1 | 4/2017 | Luo et al. | |
| 2018/0074349 A1 | 3/2018 | Fujikata et al. | |
| 2019/0293971 A1* | 9/2019 | Yu | G02F 1/017 |
| 2020/0292854 A1* | 9/2020 | Zhang | G02F 1/025 |
| 2022/0291450 A1* | 9/2022 | Zhong | C03C 25/1068 |

OTHER PUBLICATIONS

International Search Report and Written Opinion of the International Searching Authority, Mailed Oct. 22, 2020, Corresponding to PCT/EP2020/073756, 11 pages.

Liang, D. et al., "A Tunable Hybrid III-V-on-Si MOS Microring Resonator with Negligible Tuning Power Consumption", Optical Fiber Communications, Mar. 20, 2016, 3 pages, Optical Society of America.

Sun, J. et al., "A 128 Gb/s PAM4 Silicon Microring Modulator", Optical Fiber Communications, Mar. 11, 2018, 3 pages, Optical Society of America.

U.K. Intellectual Property Office Search and Examination Report, dated Feb. 8, 2021, for Patent Application No. GB2013282.5, 7 pages.

U.K. Intellectual Property Office Examination Report, dated Mar. 14, 2022, for Patent Application No. GB2013282.5, 3 pages.

\* cited by examiner

OPTICAL MODULATOR

CROSS REFERENCE TO RELATED APPLICATIONS

This application is a National Stage Application of PCT/EP2020/073756, filed 25 Aug. 2020, which claims benefit of Ser. No. 62/891,878, filed 26 Aug. 2019 and Ser. No. 62/933,286, filed Nov. 8, 2019 in the United States; each of the applications identified in this paragraph is incorporated herein by reference. To the extent appropriate, a claim of priority is made to each of the above-identified applications.

FIELD OF THE INVENTION

The present invention relates to an optical modulator.

BACKGROUND

Metal Oxide semiconductors capacitors (MOSCAPs) have been used previously in Mach-Zehnder modulator designs, and are useful for coherent communications and wavelength-division multiplexing systems where the multiplexing or de-multiplexing devices are separate from the modulators.

Micro-ring resonator based modulators (MRMs) provide significant advantages over Mach-Zehnder modulator designs, as they are compact, efficient, and can remove the need for multiplexors.

However MRM design balances trade-offs between modulation efficiency and speed. As the micro-ring is resonant, a lower optical loss in the ring results in a more narrow resonance, which in turn requires a lower voltage to modulate a fixed wavelength. However, a lower optical loss in the ring also results in a longer photon lifetime in the ring, and this reduces the modulation bandwidth of the device.

There is a balance then to be struck between these two effects, in order to achieve the lowest drive voltage for a specified bandwidth, creasing a loss budget for the MRM.

MOSCAP junctions within an MRM would offer improved phase modulation efficiency as compared to loss. However it is difficult to implement a MOSCAP within a MRM, as coupling light into and out of the MRM can be problematic.

SUMMARY

Accordingly, in a first aspect, the invention provides an optical modulator comprising:
a micro-ring resonator; and
a bus waveguide, including an input waveguide region, an output waveguide region, and a coupling waveguide region optically coupled to the micro-ring resonator and located between the input waveguide region and the output waveguide region;
wherein the micro-ring resonator includes a modulation region, the modulation region being formed of a silicon portion and a III-V semiconductor portion separated by a crystalline rare earth oxide, REO, dielectric layer.

Advantageously, such a modulator displays a high efficiency which increases the flexibility in designing said modulator. As such, the modulator can achieve a lower drive voltage for the same bandwidth specification as compared to a conventional modulator.

The optical modulator may have any, or any combination insofar as they are compatible, of the optional features set out below.

The crystalline rare earth oxide may be a crystalline form of any of the following: yttrium oxide; lanthanum oxide; cerium oxide; praseodymium oxide; neodymium oxide; samarium oxide; europium oxide; gadolinium oxide; terbium oxide; dysprosium oxide; holmium oxide; erbium oxide; ytterbium oxide; lutetium oxide; scandium oxide; or thulium oxide.

The modulation region may be a MOS capacitor region. The silicon portion and the III-V semiconductor portion may be doped with dopants of opposite polarity to form a MOS capacitor region. The silicon portion may have a height (as measured in a direction perpendicular to a guiding direction of the bus waveguide) of up to 1 µm. The III-V semiconductor portion may have a height (as measured in a direction to a guiding direction of the bus waveguide) of up to 1 µm. The dielectric layer may have a height (as measured in a direction perpendicular to a guiding direction of the bus waveguide) of up to 1 µm.

The dielectric layer, also referred to as an insulator layer, may extend across the modulation region at an oblique angle. For example, the insulator layer may extend across the modulation region at an angle greater than 0° and less than 90°. This can increase the effective area between the dielectric layer, the silicon portion, and the III-V semiconductor portion, and so increase the efficiency of the modulation region.

The modulation region may be within an arc of the micro-ring resonator.

The micro-ring resonator may be formed of a layer of silicon, a layer of crystalline rare oxide adjacent to the silicon layer, and a layer of III-V semiconductor adjacent to the crystalline rare earth oxide. The micro-ring resonator may be formed of only these layers, where portions of the layers are doped. The coupling waveguide region of the bus waveguide may include a layer of silicon, a layer of crystalline rare earth oxide adjacent to the silicon layer, and a layer of III-V semiconductor adjacent to the crystalline rare earth oxide layer. The geometries and doping profiles of the layers of the coupling waveguide region may be substantially identical to the geometries and doping profiles of the layers of the micro-ring resonator adjacent to the coupling waveguide region. The input waveguide region of the bus waveguide may be formed of a silicon waveguide, and may include an input transition region which transitions from the silicon waveguide to a waveguide formed of a layer of silicon, a layer of crystalline rare earth oxide adjacent to the silicon layer, and a layer of III-V semiconductor adjacent to the crystalline rare earth oxide layer. The output waveguide region of the bus waveguide may be formed of a layer of silicon, a layer of crystalline rare earth oxide adjacent to the silicon layer, and a layer of III-V semiconductor adjacent to the crystalline rare earth oxide layer, and may include an output transition region which transitions to a silicon waveguide.

The bus waveguide may be a silicon waveguide, and the coupling waveguide region of the bus waveguide may have a refractive index substantially equal to the refractive index of a region of the micro-ring resonator adjacent to the coupling waveguide region.

The micro-ring resonator may include a second modulation region, circumferentially spaced form the first. The modulation regions may share a doped region.

The micro-ring resonator may include a heater, which is configured to tune an operation wavelength of the modulation region. The heater may be located at a point circumferentially between the modulation regions when there is more than one modulation region.

The input waveguide region of the bus waveguide may taper from a first width, proximal to an edge of the device, to a second width, proximal to the coupling waveguide region of the bus waveguide. The first width may be larger than the second, and in some examples may be at least twice as wide as the second width.

The output waveguide region of the bus waveguide may widen from a first width, proximal to the coupling waveguide region of the bus waveguide, to a second width, proximal to an edge of the device. The first width may be smaller than the second, and in some examples may be at least half as narrow as the second width.

The input waveguide region, coupling waveguide region, and output waveguide region may have the same width as measured in a direction perpendicular to the guiding direction of the bus waveguide. The width may be at least 200 nm and no more than 300 nm, in some embodiments the width is 220 nm, in some embodiments, the width may be no more than 10 μm.

The optical modulator may further comprise a second bus waveguide, located on an opposing side of the micro-ring resonator to the first bus waveguide.

The III-V semiconductor may be either indium phosphide (InP), indium gallium arsenide phosphide (InGaAsP), or indium aluminium arsenide (InAlAs).

The inside of the ring may be formed of silicon, or the III-V semiconductor. The outside of the ring, and an area around the micro-ring resonator that does not form the resonator may be formed of silicon or III-V semiconductor.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
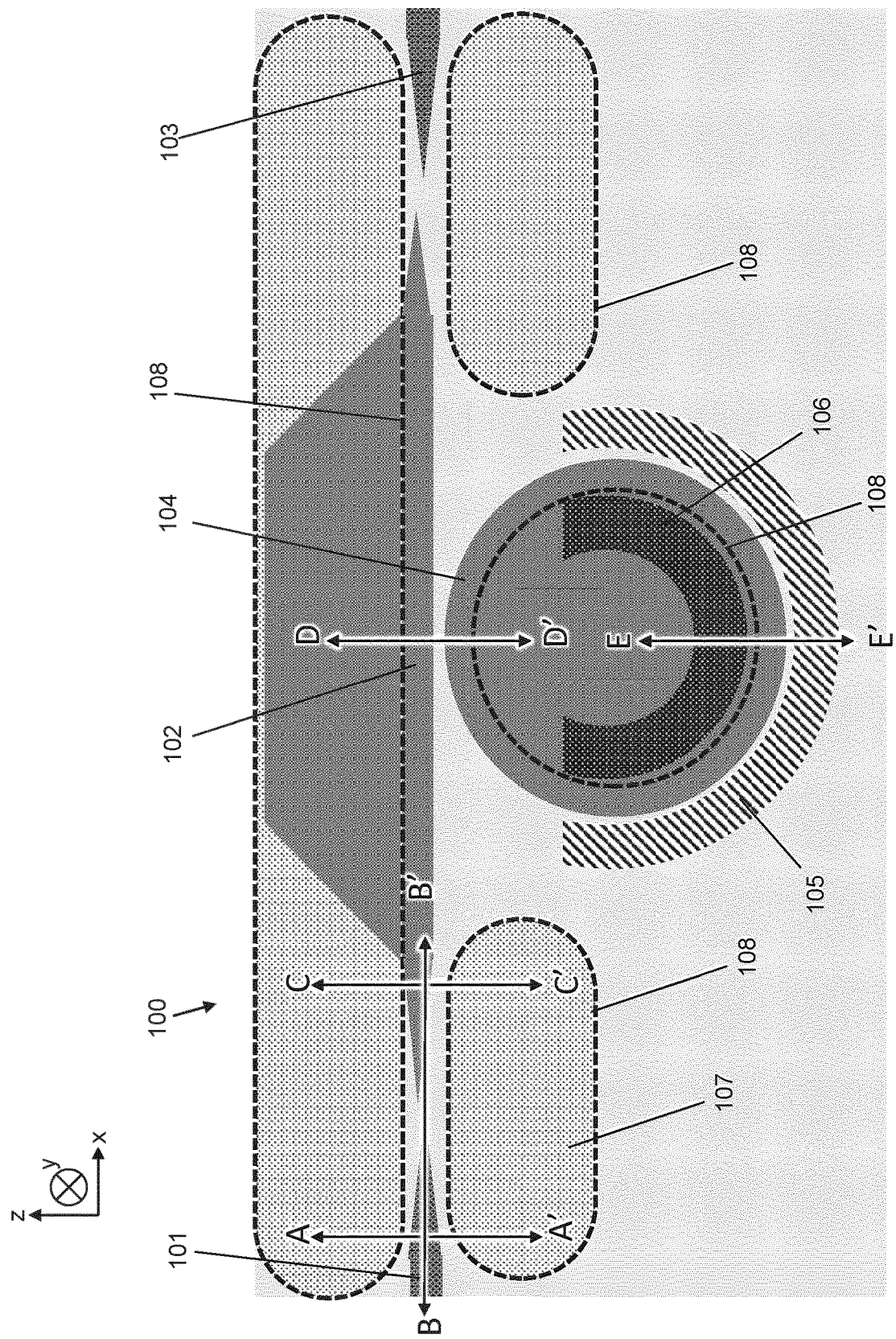
FIG. 1 shows a top-down schematic view of an optical modulator according to an embodiment of the present invention.
Figure 8:
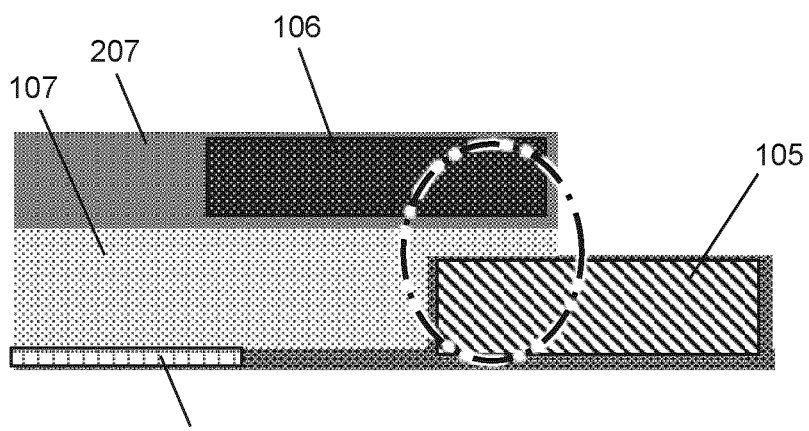
FIG. 8 shows a cross-sectional view of the optical modulator of FIG. 7.

FIG. 1 shows a top-down schematic view of an optical modulator 100 according to an embodiment of the present invention. The modulator includes a bus waveguide which is formed of an input waveguide region 101, a coupling waveguide region 102, and an output waveguide region 103. In use, light enters the modulator 100 at the input waveguide region, is coupled into a micro-ring resonator 104. The micro-ring resonator 104 includes a modulation region, formed of a p-doped region 105 and an n-doped region 106 separated by an insulator 107. The n-doped region's shape may be different to that shown in the figure, it can be both rectangular (e.g. as shown in FIG. 8) and/or comprise two different depth regions as shown in FIG. 2E. In this example, the p-doped region 105 is formed from silicon, and the n-doped region is formed from a III-V semiconductor (e.g. indium phosphide (InP)). The insulator is a crystalline rare earth oxide. Due to the manufacturing process used, the insulator also extends to regions either side of the bus waveguide as indicated. Trenches 108 are cut into the device to define the bus waveguide and micro-ring resonator.

Light coupled into the micro-ring resonator 104 is modulated in the modulation region. In this example, the modulation region forms a metal oxide semiconductor capacitor (MOSCAP) and so the Franz-Keldysh, or plasma dispersion, effect is utilised to modulate the amplitude of light passing through the modulation region. After modulation, the light is coupled back into the bus waveguide, and is outputted from the modulator 100 at the output waveguide region 103.

Figure 2A:
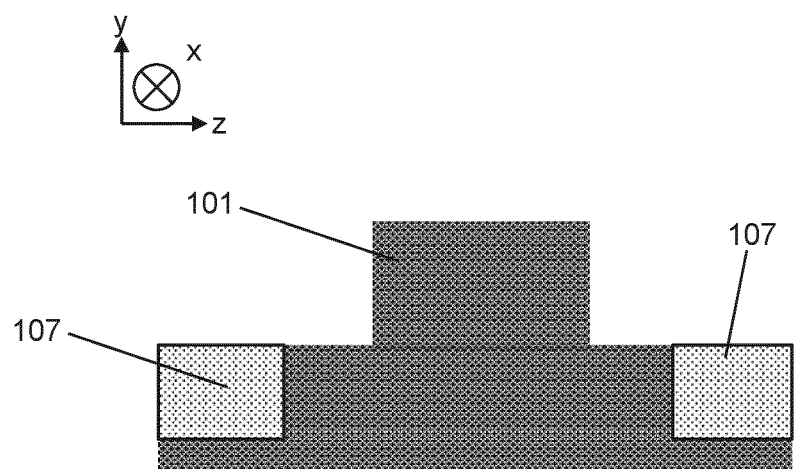
FIGS. 2A-2E show various cross-sections of the optical modulator in FIG. 1.
Figure 2B:
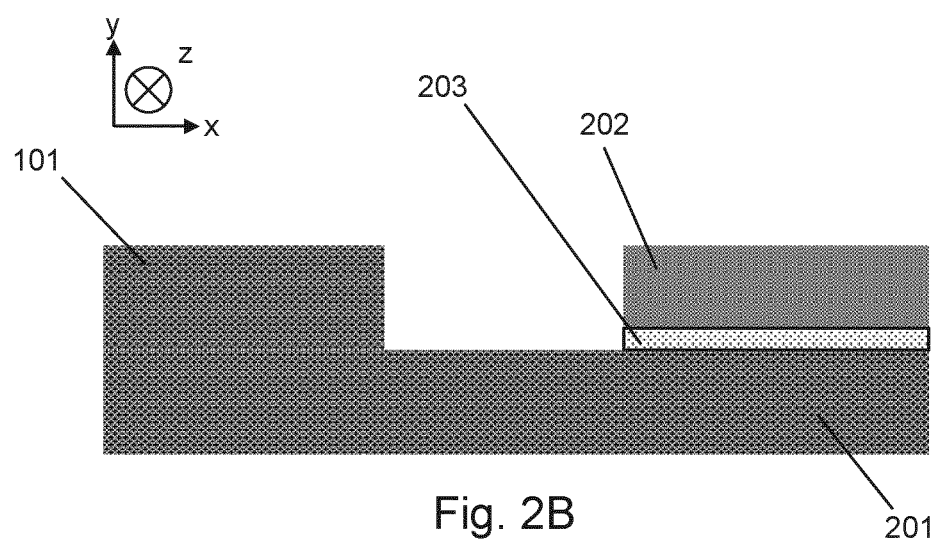
Figure 2C:
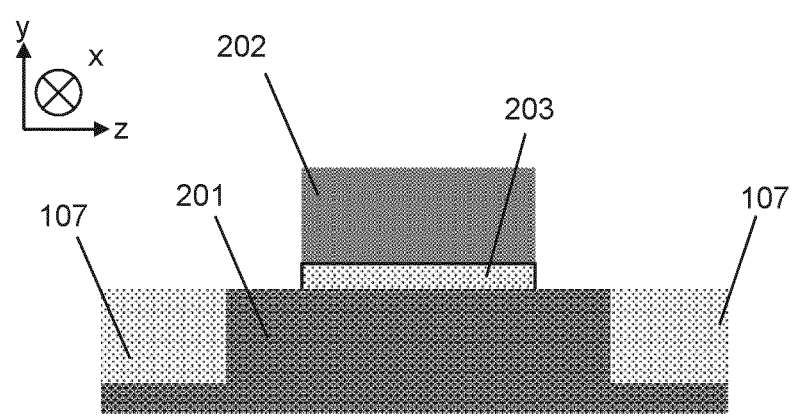
Figure 2D:
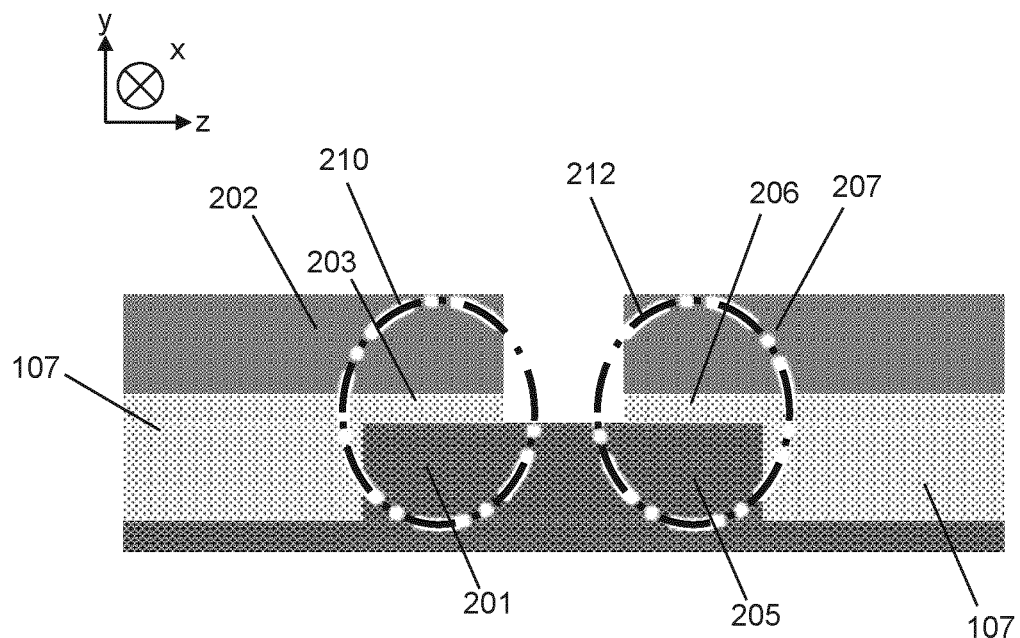
Figure 2E:
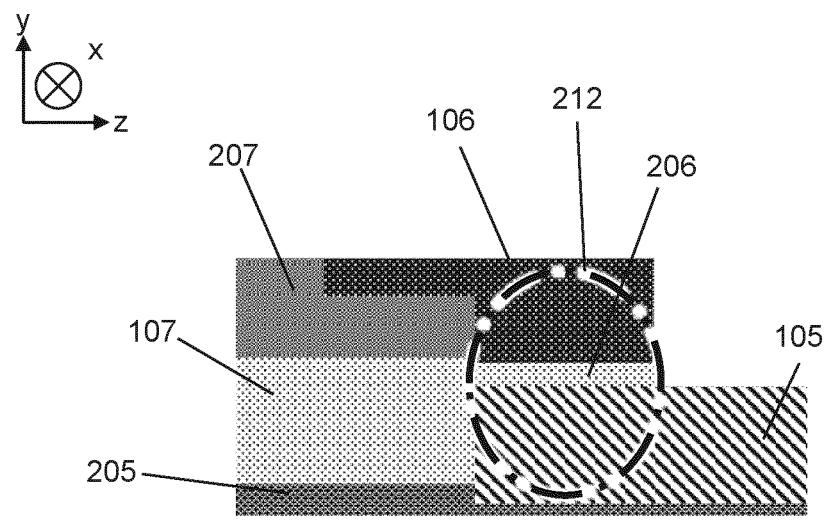

FIGS. 2A-2E show cross-sections of the modulator 100 along the lines A-A', B-B', C-C', D-D' and E-E' respectively. FIG. 2A shows a cross-section taken through the input waveguide region 101 of the bus waveguide. Light is guided in a direction into/out of the plane of the figure, i.e. in the x direction. As can be seen, insulator 107 is present either side of a base portion of the input waveguide region and provides horizontal cladding of the waveguide. Notably, the input waveguide region tapers from a first width of around 220 nm at a position adjacent to the edge of the modulator 100, to a second width of around 100 nm.

FIG. 2B is a cross-section taken along the line B-B', across a portion of the bus waveguide in which the input waveguide region 101 tapers from a Si based waveguide to a Si 201/InP 202 based waveguide with an insulator layer 203 formed of crystalline REO between the Si and InP layers). In this view, light is guided across the figure and is coupled from the pure Si waveguide into the Si/InP waveguide. FIG. 2C is a cross-section taken along the line C-C', across a portion of the bus waveguide after the taper discussed above is completed. Here, the structure of the bus waveguide in the coupling region is shown in more detail. A silicon base 201 is provided, and provided with horizontal cladding by insulator 107. A layer of insulator 203 is provided between the silicon base layer 201 and an InP ridge portion 202. The insulator 203, Si region 201, and InP region 202, may all have a thickness (as measured in the y direction) of no more than 1 µm.

FIG. 2D is a cross-section taken along the line D-D', across a portion of the coupling waveguide region of the bus waveguide and a portion of the micro-ring resonator 104. The structure of the coupling waveguide region (left hand side), in this example, is mirrored in that it is formed of: a silicon base 205, a layer of insulator 206, and an InP ridge portion 207. The silicon bases in each portion are contiguous, as shown. This allows an optical mode 210 present in the bus waveguide to be replicated, providing an identical or mirror symmetric optical mode 212 in the micro-ring resonator. Optical modes are indicated in the figures through dash and dotted lines. Accordingly, light present in the bus waveguide can be evanescently coupled into the micro-ring resonator and vice versa.

Figure 16:
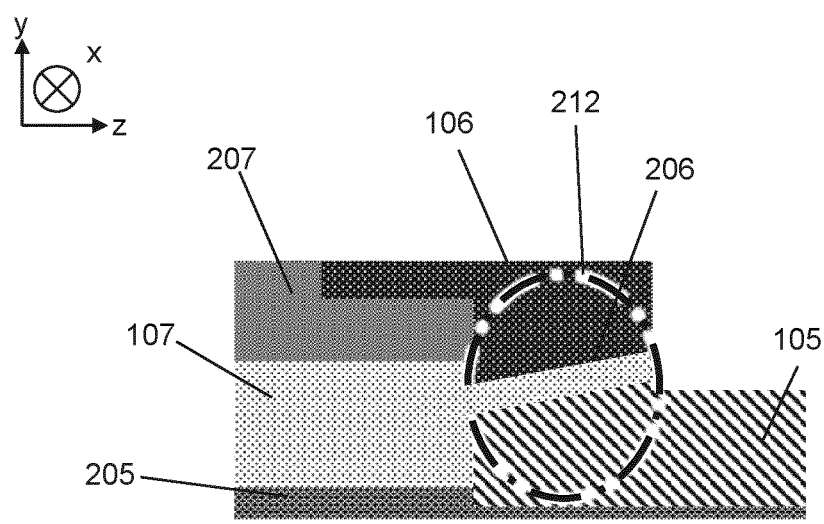
FIG. 16 shows a cross-section along the line E-E' of a variant modulation region.

FIG. 2E is a cross-section taken along the line E-E', across a modulation region of the micro-ring resonator 104. As can be seen, the optical mode 212 supported by the micro-ring resonator passes through a MOSCAP modulator formed by n doped region 106, p-doped region 105, and insulator 206. Each of the doped regions can be connected to respective electrodes (not shown) such that a voltage can be applied and the modulator switched between a modulating and non-modulating state. In the example shown, the insulator layer 206 extends horizontally across the MOSCAP modulator. However in other examples, such as one shown in FIG. 16, the insulator layer may extend at an oblique angle, for example at an angle of greater than 0° (a horizontal junction) and less than 90° (a vertical junction). Such an insulator layer can increase the effective area of the junction between the p-doped region and n-doped region to thereby increase the efficiency of the MOSCAP modulator.

Figure 3:
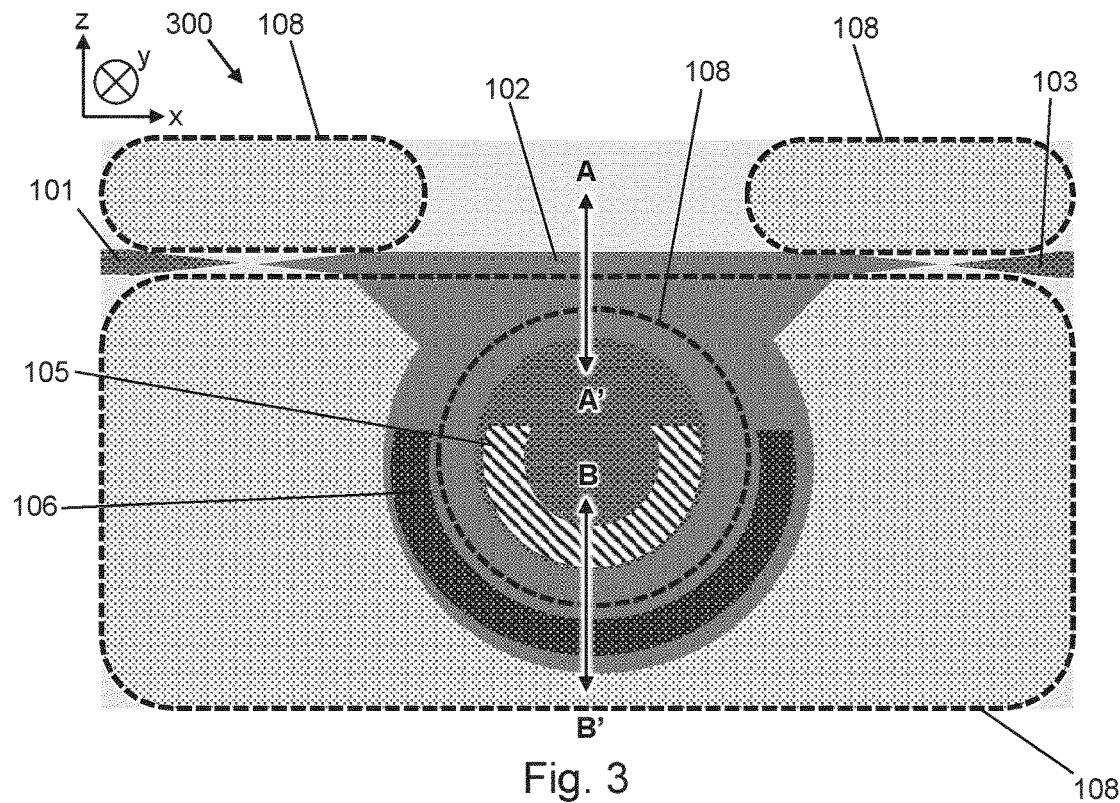
FIG. 3 shows a top-down schematic view of a variant optical modulator according to an embodiment of the present invention.

FIG. 3 shows a top-down schematic view of a variant optical modulator 300 according to an embodiment of the present invention. Where the variant optical modulator 300 has features in common with the modulator 100 shown in FIG. 1, these features are indicated by the same reference numeral. In contrast to the modulator 100 shown in FIG. 3, the micro-ring resonator of modulator 300 is filled with silicon and the InP layer extends only around the outside of the ring (as shown). Advantageously, this means that the accuracy of the InP etch (to define the InP layer) does not determine the accuracy of the gap (in a horizontal direction) between the n-doped and p-doped regions in the coupling region as seen in FIG. 4A.

Figure 4A:
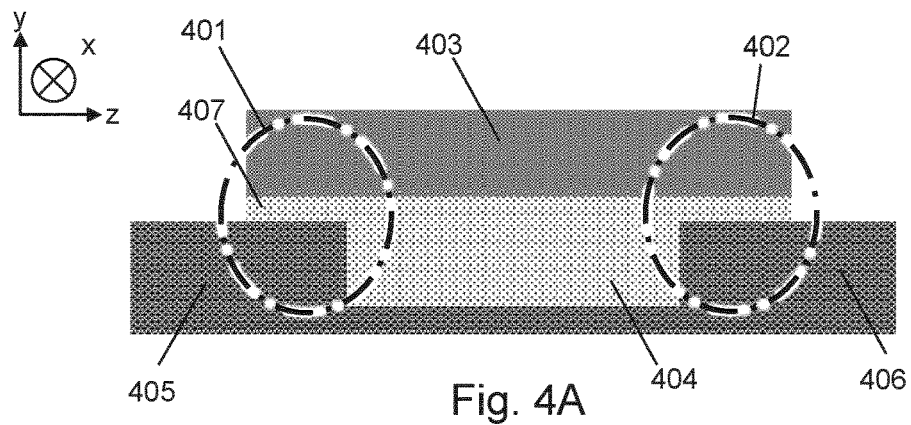
FIG. 4 shows a cross-sectional view of the optical modulator of FIG. 3.
Figure 4B:
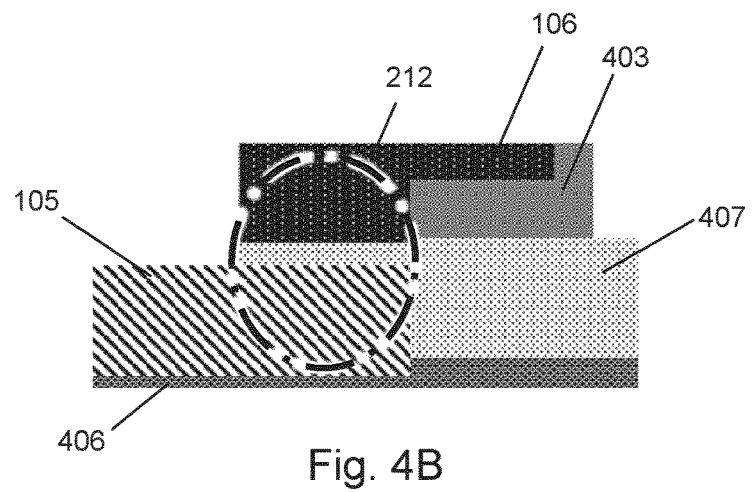

FIG. 4A is a cross-section taken along the line A-A' in FIG. 3. It shows the optical mode 401 in the bus waveguide as compared to the optical mode 402 in the micro-ring resonator. The space between the bus waveguide and the micro-ring modulator is bridged by InP 403 and crystalline REO 404, the REO being positioned above the silicon substrate and defining a trench. The coupling waveguide region 102 of the bus waveguide can be seen in more detail here, with silicon slab 405 separated from InP ridge 403 by a layer of crystalline REO 407. The same structure is seen in the micro-ring resonator (right hand side). FIG. 4B is a cross-section taken along the line B-B' in FIG. 3. It shows the modulation region of the micro-ring resonator in modulator 300. In contrast to the modulation region shown in FIG. 2E, the n-doped region 106, located in InP layer 403 is provided in the upper portion of the waveguide and the p-doped 105 region, located in the Si layer 406, is provided in the lower portion of the waveguide.

Figure 5:
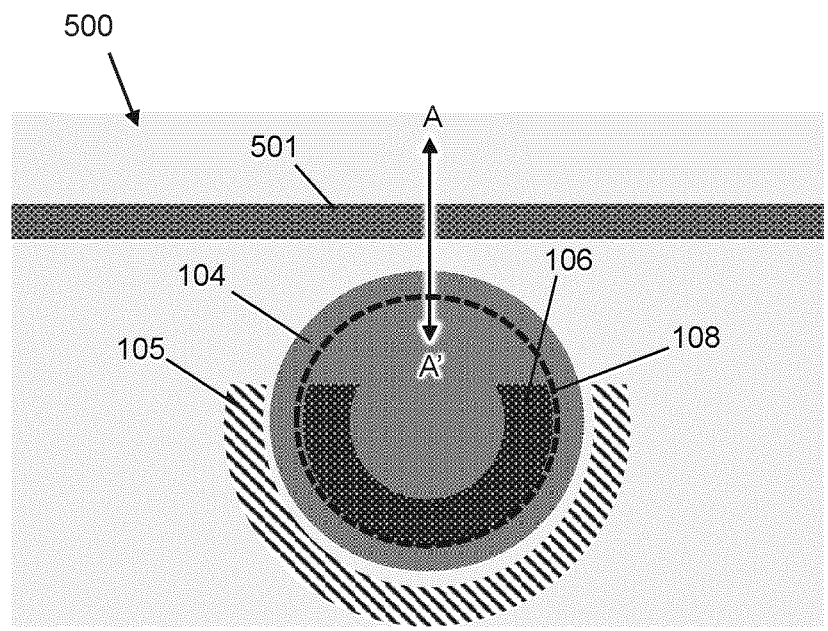
FIG. 5 shows a top-down schematic view of a variant optical modulator according to an embodiment of the present invention.

FIG. 5 shows a top-down schematic view of a variant optical modulator 500 according to an embodiment of the present invention. Where the variant optical modulator has features in common with previously described embodiments, like features are indicated by like reference numerals.

Figure 6:
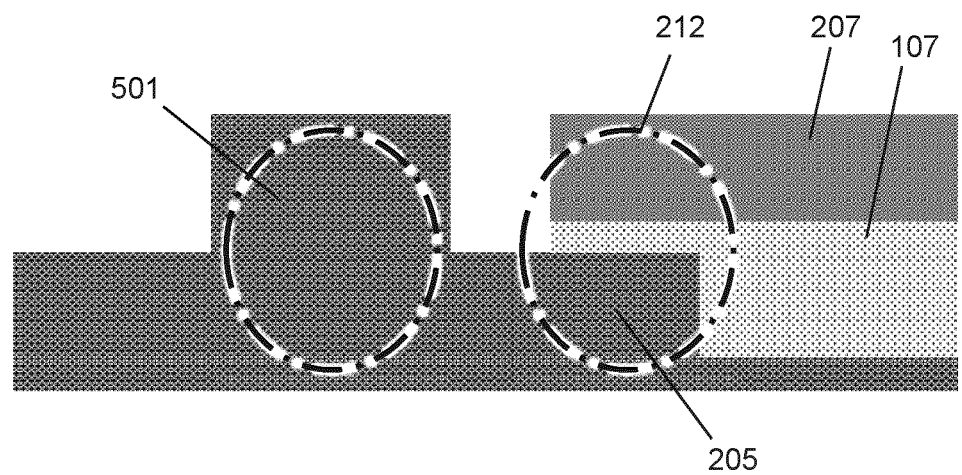
FIG. 6 shows a cross-sectional view of the optical modulator of FIG. 5.

In contrast to the modulators discussed previously, the bus waveguide 501 in this example is formed solely of silicon and contains no tapered regions. The waveguide is approximately 220 nm wide, as shown in FIG. 6 which is a cross-section of FIG. 5 taken along the line A-A'. Advantageously, modulator 500 does not require transitions from a 220 nm silicon waveguide to 100 nm silicon waveguide and then to a Si/crystalline REO/InP waveguide. However, the refractive index of the silicon bus waveguide should be close to or matched to the refractive index of the Si/crystalline REO/InP waveguide in the micro-ring resonator.

Figure 7:
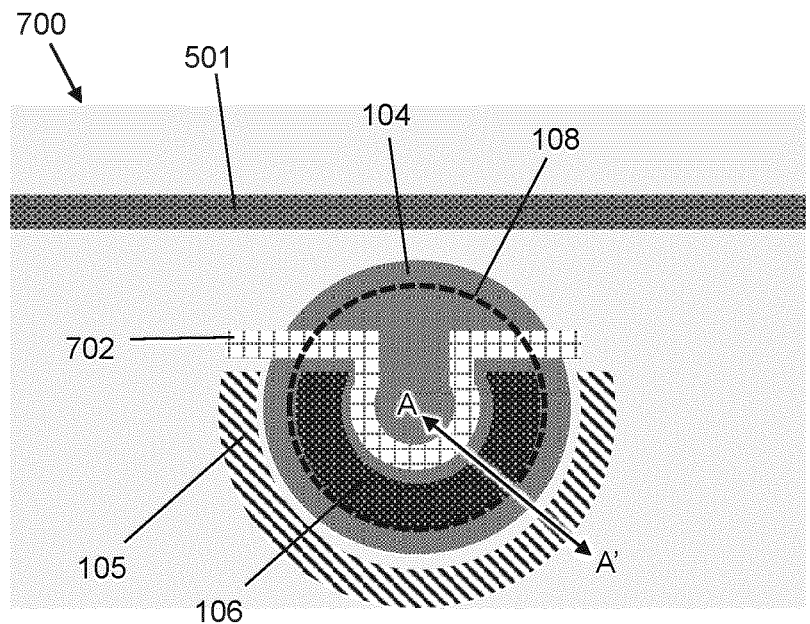
FIG. 7 shows a top-down schematic view of a variant optical modulator according to an embodiment of the present invention.

FIG. 7 shows a top-down schematic view of a variant optical modulator 700 according to an embodiment of the present invention. Where the variant optical modulator has features in common with previously described embodiments, like features are indicated by like reference numerals.

The modulator 700 shown in FIG. 7 differs from that shown in FIG. 5 by its inclusion of a heater 702 within the micro-ring resonator. The heater is provided as a doped silicon region, approximately 20 nm thick in the regions extending under the insulator 107. The heater can be used to tune the operating wavelength of the modulator. FIG. 8 is a cross-section through FIG. 7 alone the line A-A'. As can be seen, the modulation region has the same structure as described previously. In addition to the modulation region, heater 702 extends from a radially inner portion of the ring towards the junction formed between doped regions 105 and 106. The heater is connected to electrodes (not shown) so a current can be passed through it.

Figure 9:
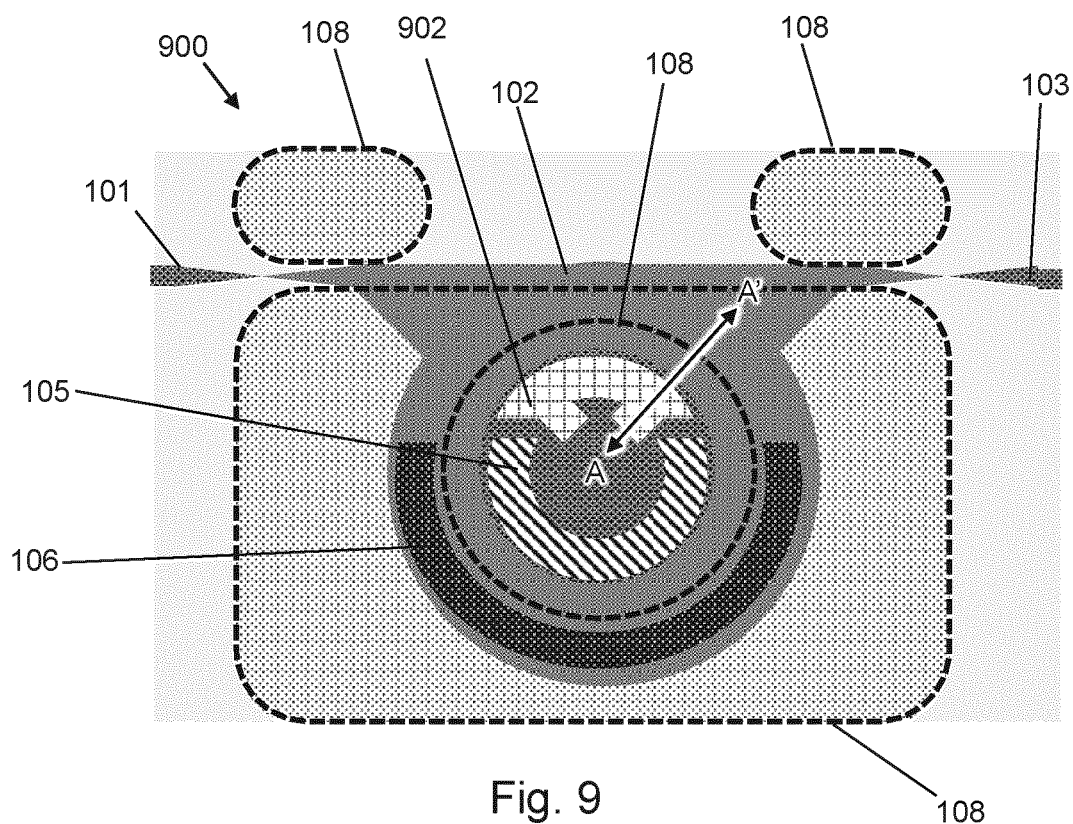
FIG. 9 shows a top-down schematic view of a variant optical modulator according to an embodiment of the present invention.

FIG. 9 shows a top-down schematic view of a variant optical modulator 900 according to an embodiment of the present invention. Where the variant optical modulator has features in common with previously described embodiments, like features are indicated by like reference numerals.

Figure 10:
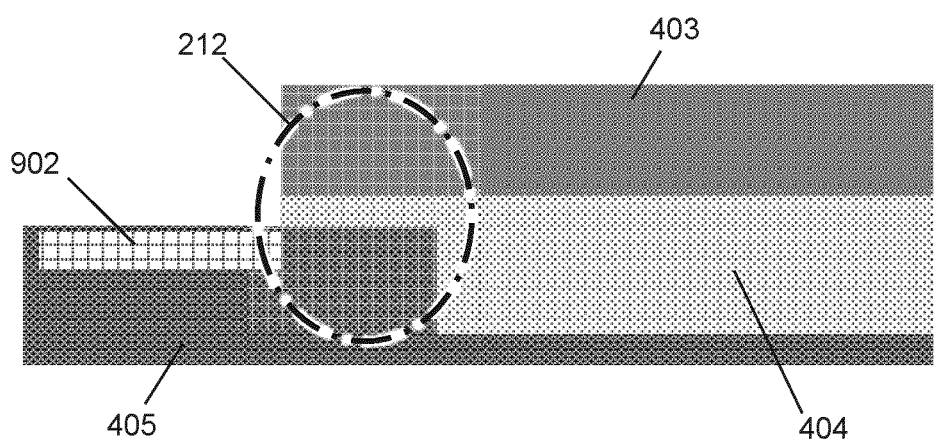
FIG. 10 shows a cross-sectional view of the optical modulator of FIG. 9.

In contrast to the modulator 300 shown in FIG. 3, modulator 900 includes a heater 902 located within the micro-ring resonator. The heater is within the centre of the ring, and is self-aligned with the non-modulating region of the micro-ring resonator. FIG. 10 is a cross-section of FIG. 9 taken along the line A-A'. As can be seen, the heater 902 is provide as a doped region of the silicon slab 405 and is connected to electrodes (not shown).

Figure 11:
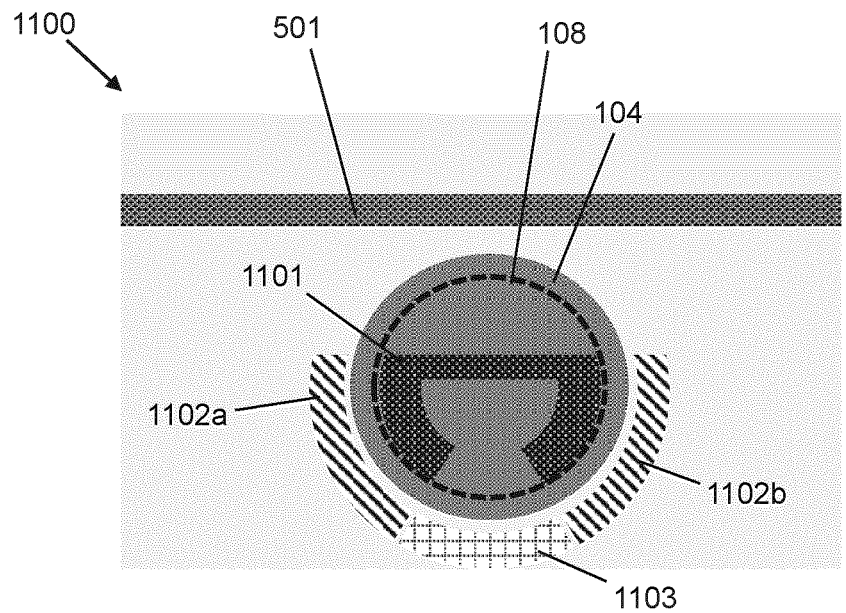
FIG. 11 shows a top-down schematic view of a variant optical modulator according to an embodiment of the present invention.

FIG. 11 is a top-down schematic view of a variant optical modulator 1100 according to an embodiment of the present invention. Where the variant optical modulator has features in common with previously described embodiments, like features are indicated by like reference numerals.

In contrast to the modulator 700 shown in FIG. 7, the micro-ring resonator 104 of modulator 700 comprises two modulation regions. The first modulation region is formed by a first portion of n-doped region 1101 (which has an open 'D' shaped configuration) and a first p-doped region 1102a. The n-doped region has a second portion, circumferentially spaced from the first, which together with the second p-doped region 1102b forms the second modulation region. Heater 1103 is located between the two p-doped regions, in an arc segment along the same circumference as the first and second p-doped regions. As will be appreciated, both the first and second modulation regions share a doped region in that the n-doped region is contiguous.

Figure 12:
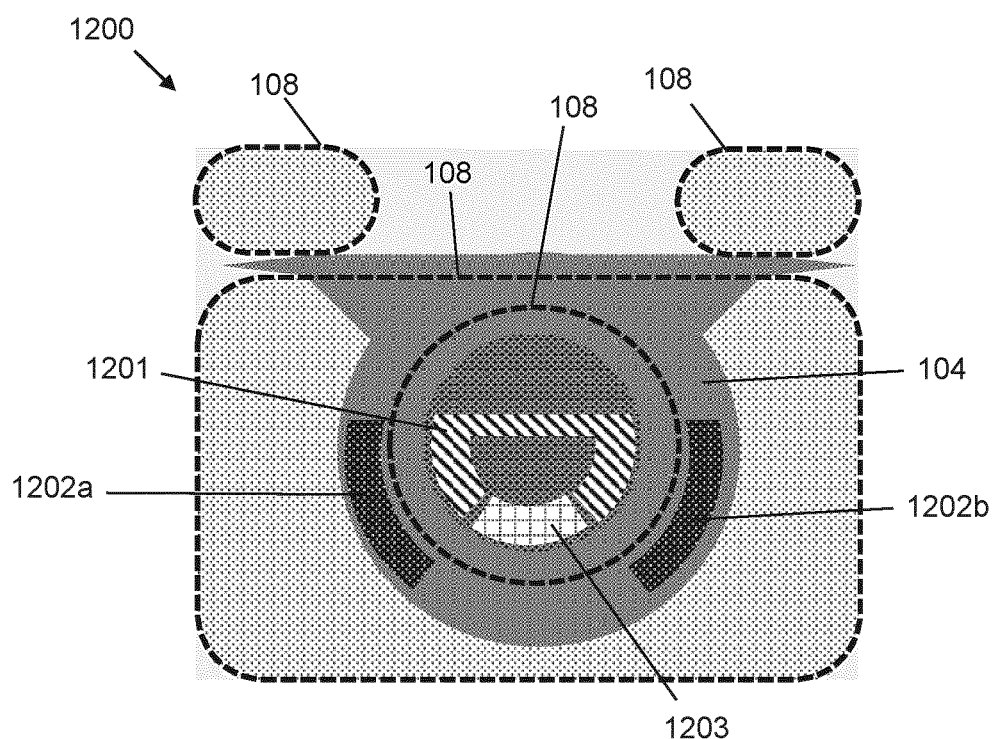
FIG. 12 shows a top-down schematic view of a variant optical modulator according to an embodiment of the present invention.

FIG. 12 is a top-down schematic view of a variant optical modulator 1200 according to an embodiment of the present invention. Where the variant optical modulator has features in common with previously described embodiments, like features are indicated by like reference numerals.

In contrast to the modulator 900 shown in FIG. 9, the micro-ring resonator 104 of modulator 1200 comprises two modulation regions. The first modulation region is formed by a first portion of p-doped region 1201 (which has an open 'D' shaped configuration, i.e. two curved legs connected by a bar) and a first n-doped region 1202a. The p-doped region has a second portion, circumferentially spaced from the first, which together with the second n-doped region 1202b forms the second modulation region. Heater 1203 is located between the two 'legs' of the p-doped region 1201, in an arc segment along the same circumference as the 'legs' of the p-doped region. As will be appreciated, both the first and second modulation regions share a doped region in that the p-doped region is contiguous.

Figure 13:
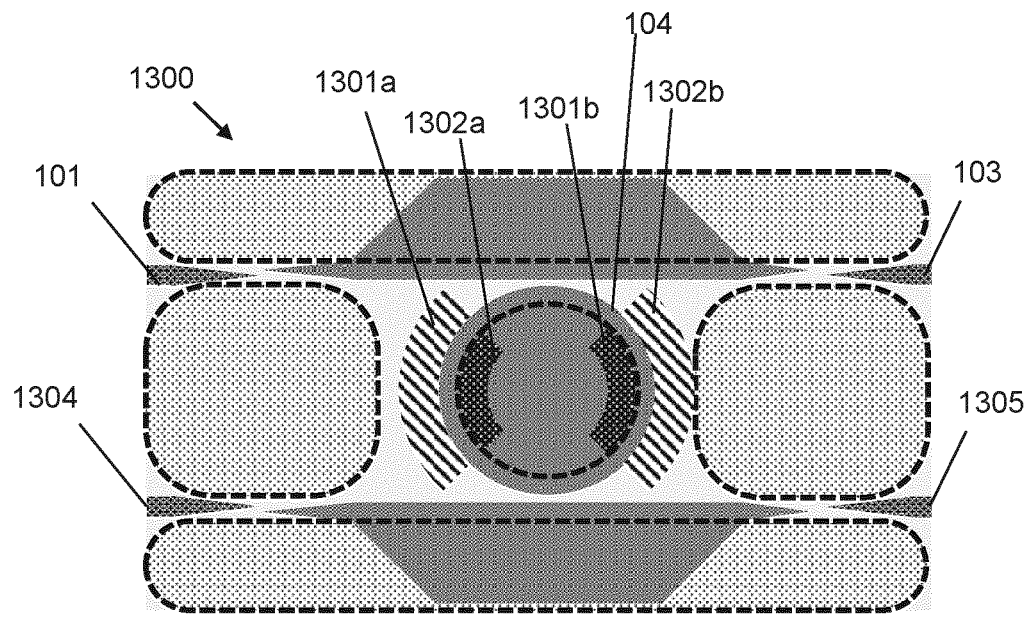
FIG. 13 shows a top-down schematic view of a variant optical modulator according to an embodiment of the present invention.

FIG. 13 is a top-down schematic view of a variant optical modulator 1300 according to an embodiment of the present invention. Where the variant optical modulator has features in common with previously described embodiments, like features are indicated by like reference numerals.

In contrast to the optical modulator 300 shown in FIG. 3, the optical modulator 1300 of FIG. 13 includes two bus waveguides located on opposing sides of the micro-ring resonator 104. The first bus waveguide, as before, provides input waveguide region 101 and output (also referred to as through) waveguide region 103. The second bus waveguide provides what is termed a drop waveguide region 1304 and add waveguide region 1305. Such a setup allows the optical modulator to also function as an add-drop multiplexer. A further difference is in the configuration of the micro-ring resonator 104. The resonator in modulator 1300 includes two modulation regions. The first modulation region is formed of a first p-doped region 1301a and a first n-doped region 1302a located on one side of the micro-ring resonator. The second modulation region is formed of a second p-doped region 1301b and a second n-doped region 1302b located on an opposite side of the micro-ring resonator to the first modulation region.

Figure 14:
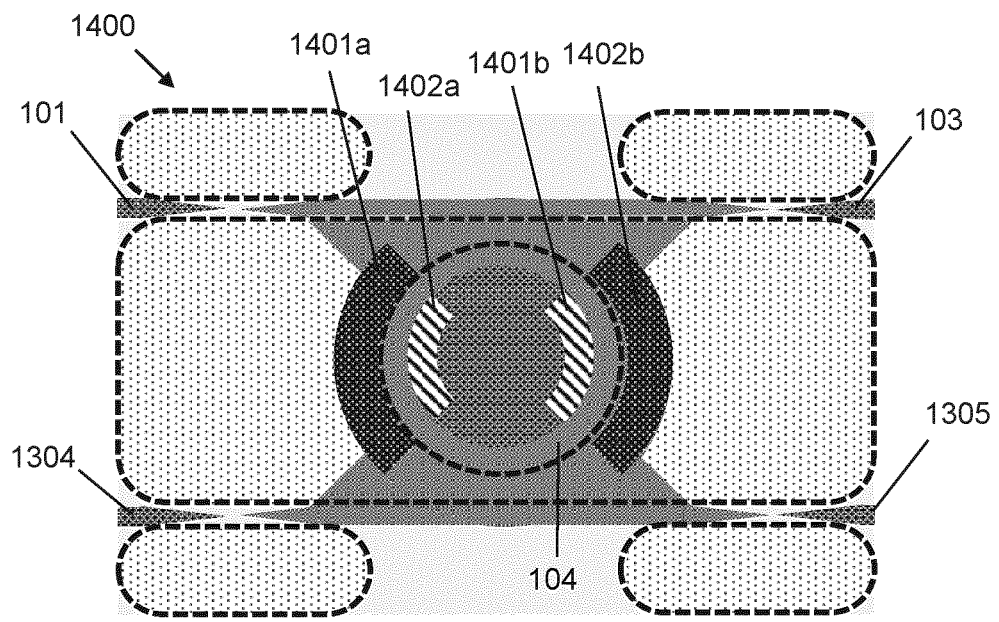
FIG. 14 shows a top-down schematic view of a variant optical modulator according to an embodiment of the present invention.

FIG. 14 is a top-down schematic view of a variant optical modulator 1400 according to an embodiment of the present invention. Where the variant optical modulator has features in common with previously described embodiments, like features are indicated by like reference numerals.

In contrast to the optical modulator 1300 shown in FIG. 13, the optical modulator 1400 has silicon present within the micro-ring resonator (as opposed to InP, in FIG. 13). The InP layer is therefore outside of the micro-ring resonator as shown in FIG. 14. This also means that the p- and n-doped regions have switched positions relative to FIG. 13. The n-doped, 1401a, 1401b regions are therefore on a larger radius of the micro-ring resonator as compared to the p-doped regions 1402a, 1402b.

Figure 15:
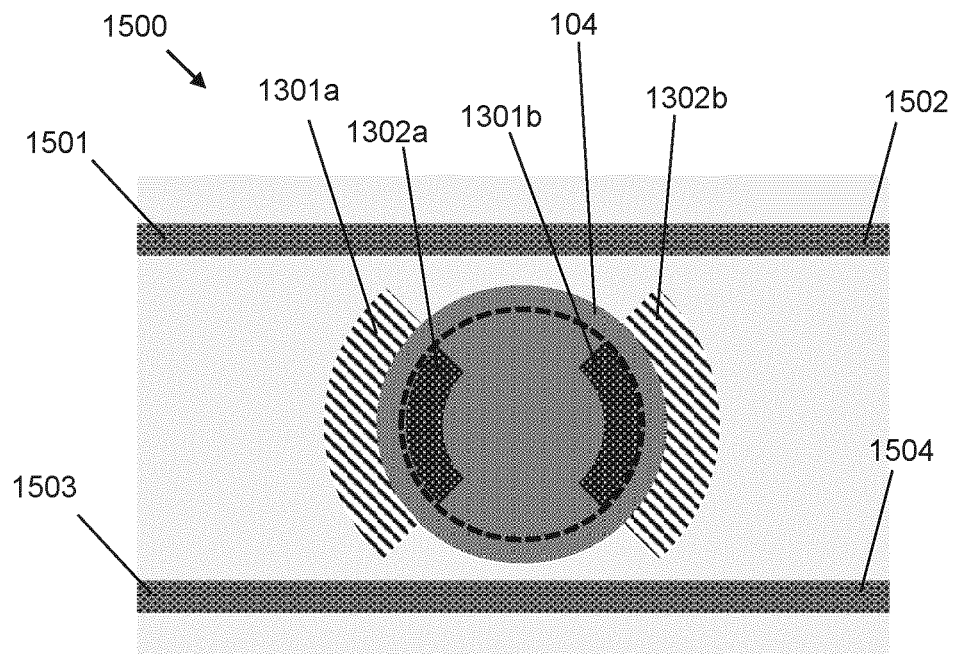
FIG. 15 shows a top-down schematic view of a variant optical modulator according to an embodiment of the present invention.

FIG. 15 is a top-down schematic view of a variant optical modulator 1500 according to an embodiment of the present invention. Where the variant optical modulator has features in common with previously described embodiments, like features are indicated by like reference numerals.

In contrast to the optical modulator 1300 shown in FIG. 13, the two bus waveguides in modulator 1500 are formed only of silicon. Therefore the input waveguide region 1501, output/through waveguide region 1502, drop waveguide region 1503 and add waveguide region 1504 have a same width.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An optical modulator, comprising:
   a micro-ring resonator; and
   a bus waveguide, including an input waveguide region, an output waveguide region, and a coupling waveguide region optically coupled to the micro-ring resonator and located between the input waveguide region and the output waveguide region,
   wherein the micro-ring resonator includes a modulation region, the modulation region being formed of a silicon portion and a III-V semiconductor portion separated by a crystalline rare earth oxide dielectric layer.

2. The optical modulator of claim 1, wherein the modulation region is a MOS capacitor region.

3. The optical modulator of claim 2, wherein the silicon portion and the III-V semiconductor portion are doped with dopants of opposite polarity to form the MOS capacitor region.

4. The optical modulator of claim 1, wherein the modulation region is within an arc of the micro-ring resonator.

5. The optical modulator of claim 1, wherein the crystalline rare earth oxide dielectric layer extends across the modulation region at an oblique angle.

6. The optical modulator of claim 1, wherein the micro-ring resonator consists of a layer of silicon comprising the silicon portion of the modulation region, the crystalline rare earth oxide dielectric layer adjacent to the silicon layer of the micro-ring resonator, and a layer of III-V semiconductor comprising the III-V semiconductor portion of the modulation region and being adjacent to the crystalline rare earth oxide dielectric layer.

7. The optical modulator of claim 6, wherein the coupling waveguide region of the bus waveguide includes a layer of silicon, a layer of crystalline rare earth oxide adjacent to the silicon layer of the coupling waveguide region, and a layer of III-V semiconductor adjacent to the crystalline rare earth oxide layer of the coupling waveguide region.

8. The optical modulator of claim 7, wherein the geometries and doping profiles of the layers of the coupling waveguide region are substantially identical to geometries and doping profiles of the layers of the micro-ring resonator adjacent to the coupling waveguide region.

9. The optical modulator of claim 7, wherein the input waveguide region of the bus waveguide is formed of a silicon waveguide, and includes an input transition region which transitions from the silicon waveguide to a first portion of the bus waveguide, the first portion of the bus waveguide being formed of a layer of silicon, a layer of crystalline rare earth oxide adjacent to the silicon layer of the first portion of the bus waveguide, and a layer of III-V semiconductor adjacent to the crystalline rare earth oxide layer of the first portion of the bus waveguide.

10. The optical modulator of claim 7, wherein the output waveguide region of the bus waveguide is formed of a layer of silicon, a layer of crystalline rare earth oxide adjacent to the silicon layer of the output waveguide region, and a layer of III-V semiconductor adjacent to the crystalline rare earth oxide layer of the output waveguide region, and includes an output transition region which transitions to a silicon waveguide.

11. The optical modulator of claim 1, wherein the bus waveguide is a silicon waveguide, wherein the coupling waveguide region of the bus waveguide has a refractive index substantially equal to the refractive index of a region of the micro-ring resonator adjacent to the coupling waveguide region.

12. The optical modulator of claim 1, wherein the modulation region is a first modulation region, and the micro-ring resonator includes a second modulation region, circumferentially spaced from the first modulation region.

13. The optical modulator of claim 12, wherein the first modulation region and the second modulation region share a doped region.

14. The optical modulator of claim 1, wherein the micro-ring resonator includes a heater, configured to tune an operation wavelength of the modulation region.

15. The optical modulator of claim 14, wherein the modulation region is a first modulation region, and the micro-ring resonator includes a second modulation region, circumferentially spaced from the first modulation region, and, wherein the heater is located at a point circumferentially between the first modulation region and the second modulation region.

16. The optical modulator of claim 1, wherein the input waveguide region of the bus waveguide tapers from a first width, proximal to an edge of the optical modulator, to a second width, proximal to the coupling waveguide region of the bus waveguide.

17. The optical modulator of claim 1, wherein the output waveguide region of the bus waveguide widens from a first width, proximal to the coupling waveguide region of the bus waveguide, to a second width, proximal to an edge of the optical modulator.

18. The optical modulator of claim 1, wherein a gap between the coupling waveguide region of the bus waveguide and the micro-ring resonator is filled with a layer of crystalline rare earth oxide and a layer of III-V semiconductor.

19. The optical modulator of claim 1, wherein:
the bus waveguide is a first bus waveguide; and
the optical modulator further comprises a second bus waveguide, located on an opposing side of the micro-ring resonator to the first bus waveguide.

20. The optical modulator of claim 1, wherein the III-V semiconductor is either InP, InGaAsP, or InAlAs.

* * * * *